United States Patent [19]

Kobayashi et al.

[11] Patent Number: 4,603,230
[45] Date of Patent: Jul. 29, 1986

[54] GRAPHICAL INPUT TERMINAL

[75] Inventors: Tadashi Kobayashi; Toshio Sato, both of Tokyo, Japan

[73] Assignee: NEC Corporation, Tokyo, Japan

[21] Appl. No.: 605,651

[22] Filed: Apr. 30, 1984

[30] Foreign Application Priority Data

May 6, 1983 [JP] Japan ............................. 58-67454[U]
May 11, 1983 [JP] Japan ............................. 58-69908[U]

[51] Int. Cl.⁴ ............................................. G08C 21/00
[52] U.S. Cl. ..................................................... 178/18
[58] Field of Search ............................. 178/18, 19, 20; 340/700, 706

[56] References Cited

U.S. PATENT DOCUMENTS 4,079,194 3/1978 Kley ....................................... 178/18

Primary Examiner—Stafford D. Schreyer
Attorney, Agent, or Firm—Laff, Whitesel, Conte & Saret

[57] ABSTRACT

A graphical input terminal for generating an electrical signal representative of a location on an input surface, with respect to a pair of coordinates, in which a character, figure or like graphical information is written by hand. A first resistive film is formed on a flat substrate which is formed with through passageways for air, while a flexible sheet is disposed to face the substrate. A second resistive film is formed on one surface of the flexible sheet to face the first resistive film at a spacing therefrom. Immediately after information has been handwritten on the input surface of the terminal, air is forced into the spacing between the first and second resistive films to separate them from each other.

3 Claims, 2 Drawing Figures

GRAPHICAL INPUT TERMINAL

BACKGROUND OF THE INVENTION

The present invention relates to a graphical input terminal for generating an electrical signal representative of a specific location on an input or writing surface, with respect to a pair of coordinates, in which a character, figure or like graphical information is written by hand.

A graphical input terminal serves to detect a location on an input or writing surface in which graphical information has been handwritten with respect to a pair of coordinates and, then, generates an electrical signal representative of that two-dimensional location (coordinate signal). In a prior art graphical input terminal, two resistive sheets are arranged at a predetermined spacing from each other in such a manner that when information is handwritten in the surface of one of the resistive sheets, the two sheets are brought into contact in the handwritten point. This specific point on the input surface with respect to the coordinates is detected in terms of a change in the resistance between opposite sides of each resistive sheets.

A graphical input terminal of the type described is disclosed in U.S. Pat. No. 3,959,585. In the disclosed terminal, the spacing or air gap between a substrate and a sheet is designed small with a view to promoting convenient writing. However, the problem with such a terminal configuration is that after two resistive films have touched each other due to a pressure manually applied by a pen or like writing implement, a long period of time is consumed from the instant the pressure applied by the pen is removed to the instant the two resistive films bodily part from each other. That is, even after the pen has been removed from the interengaging point of the resistive sheets, the interengagement is maintained until air flows into that point via the surrounding air gap to sufficiently elevate the air pressure thereat.

As described above, the small air gap between the substrate and the sheet develops resistance due to the viscosity of air which results in a substantial period of time necessary for the air to be admitted in the interengaging point of the resistive films. Therefore, shifting the pen from one position to another on the writing surface produces a contact portion in the form of a line and this line remains over a certain period of time. It is not until the surrounding air flows into the linear contact portion to sufficiently elevate the air pressure thereat that the sheet regains its original flat configuration by surface tension, thereby allowing the two resistive sheets to separate from each other. During such a period of time, a current for detecting a two-dimensional position continuously flows through the linear contact portion, disenabling the information input point to be accurately detected.

SUMMARY OF THE INVENTION

It is therefore an object of the present invention to provide a graphical input terminal which eliminates the above-discussed drawback and causes air to smoothly stream into an information input point after the entry of information, so that upper and lower resistive films may contact always in a spot at the time of entry of information so as to insure accurate detection of the spot in terms of the coordinates.

It is another object of the present invention to provide a generally improved graphical input terminal.

A graphical input terminal of the present invention generates an electrical signal representative of a location on an input surface, with respect to a pair of coordinates, in which graphical information is entered. The graphical input terminal includes a flat substrate having passageways which individually extend throughout the substrate from one to the other of its opposite surfaces. A first resistive film is formed on one of the opposite surfaces of the substrate. A flexible sheet is disposed on the substrate. Further, a second resistive film is formed on one surface of the flexible sheet to face the first resistive film at a spacing therefrom.

The above and other objects, features and advantages of the present invention will become apparent from the following detailed description taken with the accompanying drawings.

DESCRIPTION OF THE PREFERRED EMBODIMENT

While the graphical input terminal of the present invention is susceptible of numerous physical embodiments, depending upon the environment and requirements of use, a substantial number of the herein shown and described embodiment have been made, tested and used, an all have performed in an eminently satisfactory manner.

Figure 1:
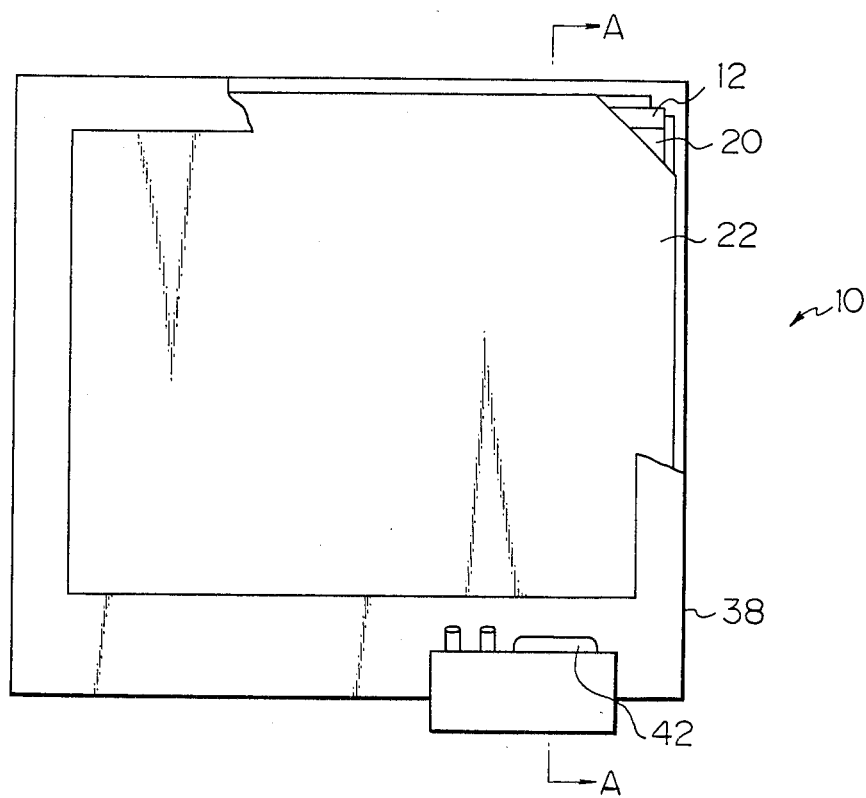
FIG. 1 is a plan view of a graphical input terminal embodying the present invention.
Figure 2:
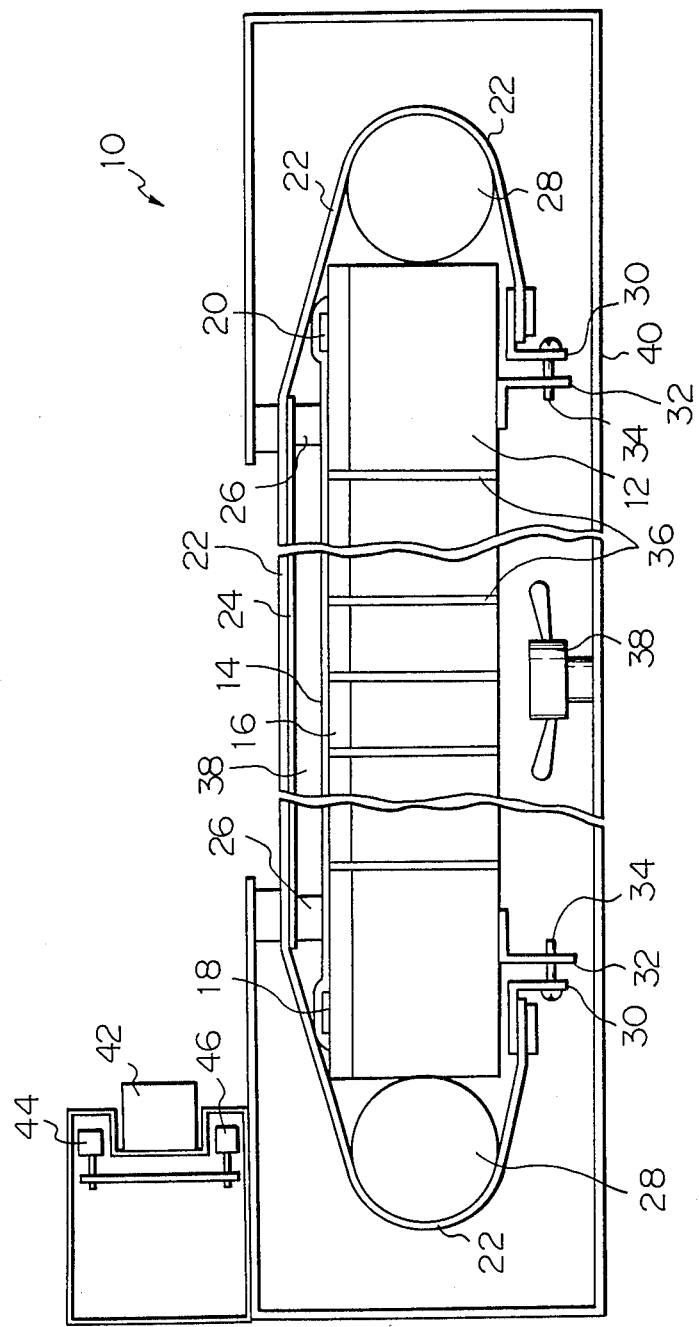
FIG. 2 is a section along line A—A of FIG. 1.

Referring to FIGS. 1 and 2, a graphical input terminal in accordance with the present invention is shown and generally designated by the reference numeral 10. The terminal 10 includes a substrate 12 made of aluminum and a uniform first resistive film 14 which is formed on the substrate 12 through a baked material 14 by screen printing. The first resistive film 14 is made of conductive ink such as carbon-loaded Viton (produced by Du Pont). The baked material 14 is employed because it is difficult to deposit the resistance film 14 directly on the aluminum substrate 12. A pair of silver electrodes 18 and 20 are disposed between the resistive film 14 and the baked material 16. As shown in FIG. 1, the resistive film 14 is absent in the four corner portions where a flexible polyester sheet 22 is removed.

A second resistive film 24 is formed by screen printing on the inner surface of the flexible sheet 22, which is colored white. The outer or upper surface of the sheet 22 is coated with silicon. Spacers 26 are arranged such that the first resistive film 14 and the sheet 22 face each other. To be furnished with flatness, the sheet 22 is rigidly retained at the back of the substrate 12 by way of cylindrical rods 28 which are mounted on the periphery of the substrate 12. That is, a generally L-shaped member 30 rigid on each end of the sheet 22 is fastened by a screw 34 to a generally L-shaped member 32 which is rigid on the substrate 12, thereby fixing the sheet 22 to the substrate 12 in a flat configuration. The screws 34 function to adjust the tension of the sheet 22.

The substrate 12 is formed with numerous passageways 36 therethroughout, while a fan 38 is mounted on a casing 40 of the terminal 10. When the fan 38 is driven for rotation, it forces air into the through passageways 36 and, therethrough, to the air gap between the first and second resistive films 14 and 24 so as to promote separation of those portions of the films 14 and 24 which have been pressurized by a pen into contact. The fan 38 is driven only when an eraser 42 is used. The use of the eraser 42 is sensed by a light emitting diode (LED) 44 and a photodiode 46 which senses light output from the LED 44.

In summary, it will be seen that the present invention provides a graphical input terminal which is capable of accurately detecting a point of information input in terms of a pair of coordinates because air is blown by a fan thereinto while an eraser is used so as to promote smooth separation of a contacting point of upper and lower resistive films.

Various modifications will become possible for those skilled in the art after receiving the teachings of the present disclosure without departing from the scope thereof.

We claim:

1. A graphical input terminal for generating an electrical signal representative of a location on an input surface, with respect to a pair of coordinates, in response to an entry of graphical information on said surface, said graphical input terminal comprising:

a flat substrate having opposite surfaces, a plurality of passageways individually extending through said substrate from one to the other of said opposite surfaces of the substrate;

a first resistive film on one of said opposite surfaces of the substrate;

a flexible sheet disposed over the substrate and being securely fastened to a back surface of the substrate, the flexible sheet comprising removed portions which correspond respectively to four corners of the substrate;

at least a pair of spacers disposed at least on opposite ends of said substrate and between said first resistive film and said flexible sheet;

means for tensioning said sheet over said spacers for holding said sheet and said resistive film in a spaced parallel relationship with an uninterrupted air space between them; and a second resistive film formed on one surface of said flexible sheet to face the first resistive film, said uninterrupted air space being formed between the first and second resistive films.

2. A graphical input terminal as claimed in claim 1, further comprising means for forcibly supplying air into the through passageways formed in the substrate.

3. A graphical input terminal as claimed in claim 2, further comprising a control circuit for causing the air supply means to operate only when information written on the flexible sheet is to be erased.

* * * * *